Jan. 29, 1963     O. GLOOR     3,075,758
ARTICULATED-ARM TORCH CUTTING MACHINE
Filed Jan. 3, 1961     3 Sheets-Sheet 1
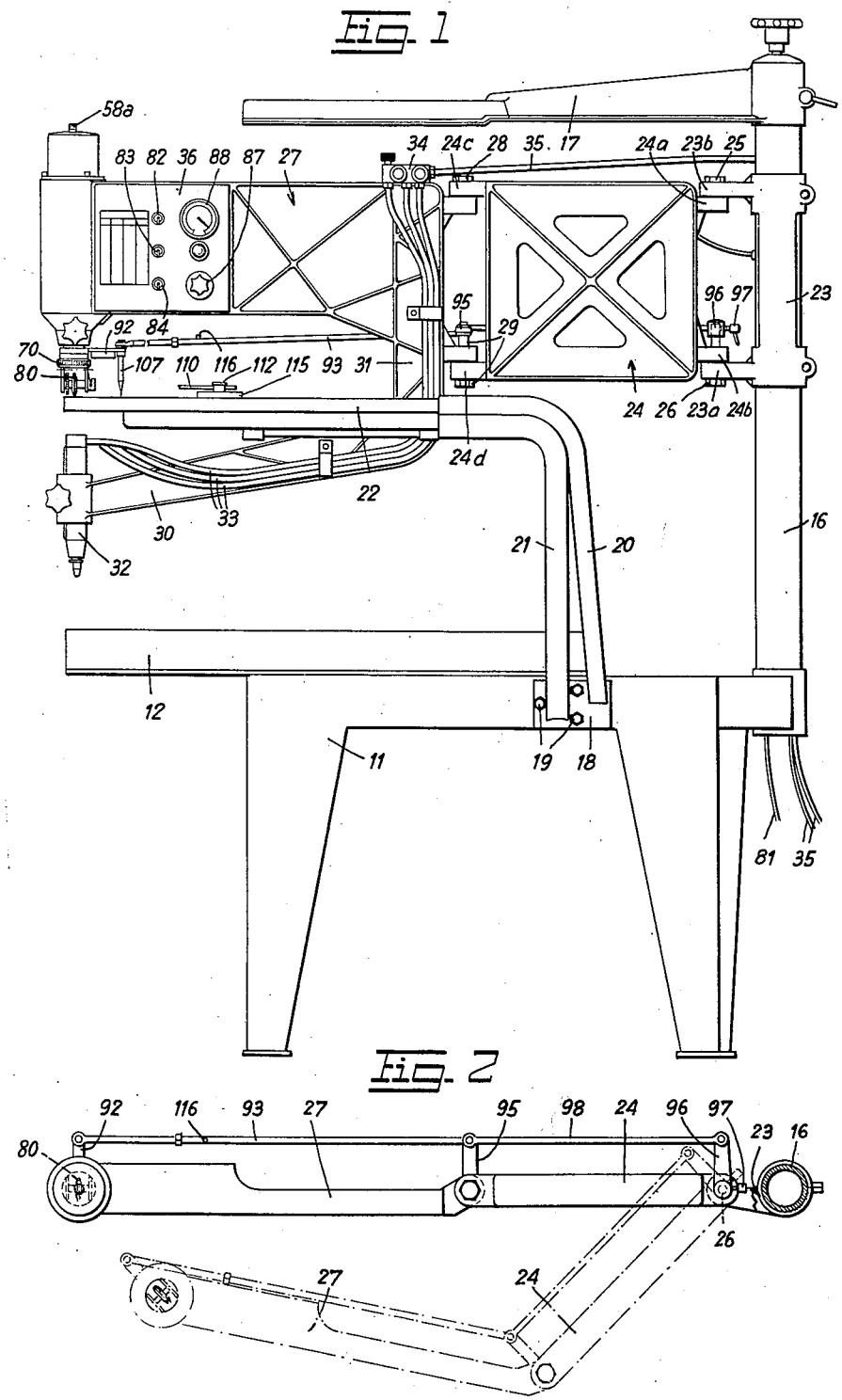

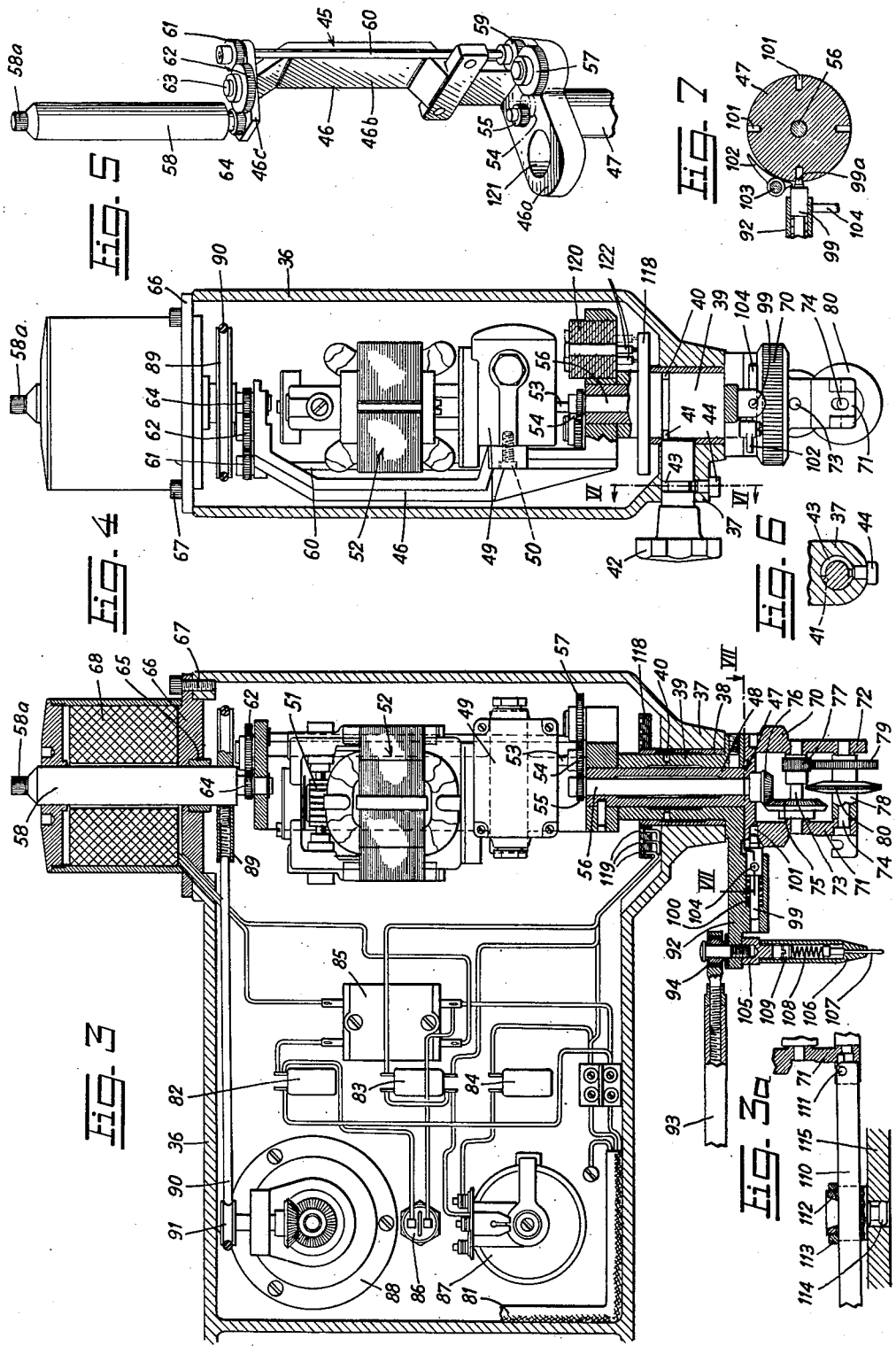

United States Patent Office 3,075,758
Patented Jan. 29, 1963

3,075,758
ARTICULATED-ARM TORCH CUTTING MACHINE
Otto Gloor, Burgdorf, Switzerland, assignor to Gebr. Gloor & Co., Burgdorf, Switzerland, a limited partnership
Filed Jan. 3, 1961, Ser. No. 80,390
4 Claims. (Cl. 266—23)

The present invention relates to a torch cutting machine, and more particularly to an articulated-arm torch cutting machine.

One object of the invention is to provide a machine of this kind that can be used, without transformation, for feed of the cutting torch either along the profile of a template or along the lines of a drawing secured to a table.

Another object of the invention is to provide the machine with a parallel guide arrangement that keeps the orientation of a table-engaging feed wheel unchanged, whereby straight cuts can easily be obtained.

Many other objects and features will appear hereinafter in the description of a preferred embodiment of the invention.

The accompanying drawings represent, by way of example, this preferred embodiment of the machine according to the invention.

FIG. 1 is a side elevational view of the machine.

FIG. 2 is a top view of a parallel guide arrangement that constitutes a component of the machine.

FIG. 3 is a vertical section view of a portion of an arm that supports the feed unit.

FIG. 3a completes the FIG. 3 and shows a compass device for guiding the cutting torch along a circle.

FIG. 4 is a vertical section view of the arm shown in FIG. 3 and shows details of the drive unit mounted on this arm.

FIG. 5 is a perspective view of a swivelling support constituting a part of the drive assembly.

FIG. 6 is a sectional view along line VI—VI in FIG. 4.

FIG. 7 is a sectional view along line VII—VII of FIG. 3.

Figure 8:
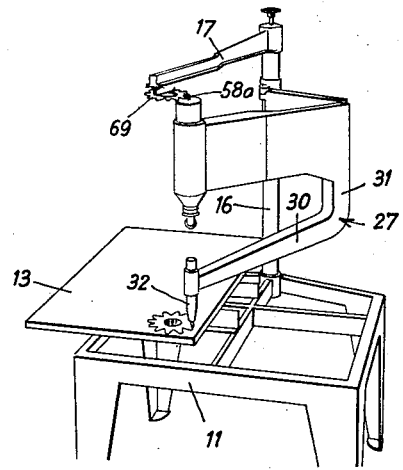

FIG. 8 is a perspective view of the machine ready for cutting to cutting sheet metal template.

Figure 9:
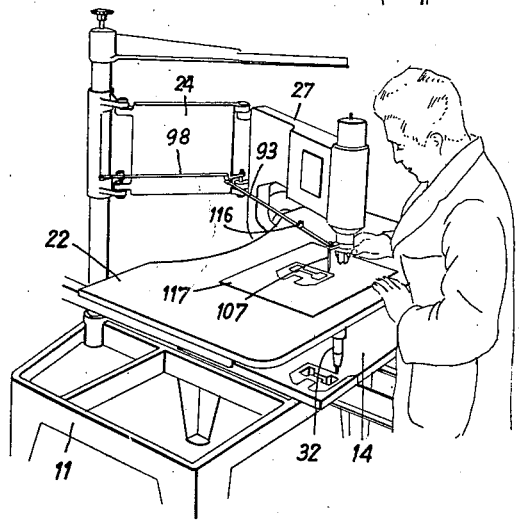
Figure 10:
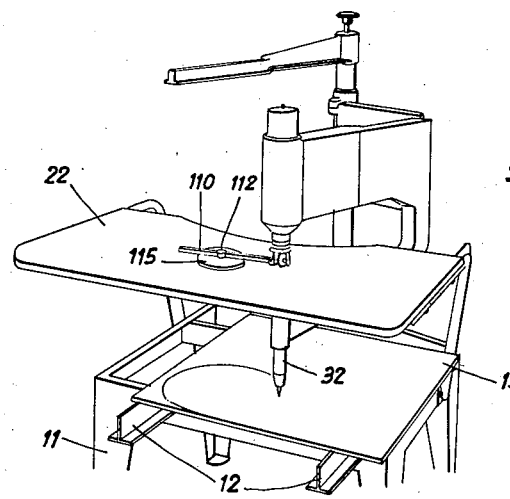

FIG. 9 is a perspective view similar to FIG. 8 and shows the machine ready for cutting direct from drawing, and FIG. 10 is a perspective view similar to FIG. 8 and shows the machine ready for automatic circular cutting with compass guide.

The machine represented on the drawings comprises a stand 11 constituted by a welded construction including two T-irons 12 serving as workpiece supports. The workpiece is shown in FIGS. 8 to 10 and is generally constituted by a sheet metal plate 13, 14 or 15. To the back of the stand a pillar 16 is secured with its lower end. This pillar extends vertically. A template supporting arm 17 is clamped to the upper end of the pillar 16.

Attachment plates 18 are secured to the stand 11 by means of screws 19. Supporting tubes 20 and 21 are welded to these attachment plates and a table 22 extending in the horizontal direction is fastened to these tubes 20 and 21.

A bracket 23 constituted by a longitudinally slit sleeve is clamped to an intermediate portion of the pillar 16. It has protruding portions 23a and 23b on which a primary arm 24 is mounted to be swingable about a vertical axis. The joints between the primary arm 24 and the portions 23a and 23b are constituted by pivot bolts 25 and 26 respectively secured to these portions and engaging bores in similar portions 24a and 24b of the primary arm 24. At its other end, this arm 24 has similar portions 24c and 24d on which a forked arm generally denoted by 27 is pivotally mounted in a similar manner by means of pivot bolts 28 and 29. The primary arm 24 and forked arm 27 extend generally in vertical planes and are constituted by rigid cast-iron parts. The forked arm 27 includes a lower leg 30 downwardly inclined from the middle portion 31 and supporting at its free end the cutting torch 32 which is downwardly directed and has a vertical longitudinal axis. This cutting torch is of a conventional construction and therefore need not be described in detail; it is connected to gas sources by means of hoses 33, of regulating valve 34, and of hoses 35.

A substantial portion of the upper leg 36 of the forked arm 27 is hollow. It supports and partly contains a feed unit. The fore end portion of the leg 36 is formed as its lower end as a bearing 37 fitted with a bushing 38 in which a sleeve 39 is mounted for rotation and for longitudinal motion. The sleeve 39 has a peripheral groove 40 engaged by an eccentered pin 41 secured to the inner front face of a manually operable setting member 42 journalled in a bore of the bearing 37. The shank of the setting member has a groove 43 extending over part of circumference as shown in FIG. 6; a stud 44 press-fitted in a bore of bearing 37 engages this groove 43. In the position of the setting member 42 which is shown in FIGS. 4 and 6, the sleeve is held in its upper end position. If the setting member 42 is somewhat turned in clockwise direction, as seen in FIG. 6, the eccentered pin 41 will move through its upper dead center and then downwardly whereby it moves the sleeve 39 downwardly by engagement of the pin 41 in the groove 40. The sleeve may then freely move upwardly and downwardly by a small amount.

FIG. 5 shows the major portion of a swivel support generally denoted by 45 made of two parts 46 and 47 of bronze. Part 47 includes a tubular portion 48 rotatably mounted in the sleeve 39 and press-fitted in a bore of the lower leg 46a of the U-shaped part 46. A reduction gear box 49 is secured to the middle portion 46b of part 46 by means of screws 50. The stator 51 of a reversible electro-motor 52 is screwed to the gear-box 49. This electro-motor drives by means of the gear-box 49 an output shaft 53 having a pinion 54 secured to its lower end. This pinion meshes with a pinion 55 secured to the upper end of a shaft 56 journalled in the tubular portion 48; it also meshes with an intermediate toothed wheel 57 which transmits the drive to a shaft 58 by means of a pinion 59, of a shaft 60 having its ends journalled in the legs 46a and 46c of part 46, of a pinion 61, of an intermediate toothed wheel 62 rotatably mounted on a stud 63 secured to leg 46c and of a pinion 64 secured to the lower end of the shaft 58. The latter is made of magnetizable steel. It is mounted for rotation in a bushing 65 fitting a recess of a cover plate 66 secured to the hollow portion 36 by means of screws 67. This cover plate constitutes a part of the housing of a magnetizing bobbing 68 that surrounds the shaft 58. The latter has a freely exposed, knurled upper end portion 58a intended to engage the profile of a template as 69 (FIG. 8) made of soft-iron and removably secured to the template support arm 17 in any appropriate manner.

A disk 118 of insulating matter is press-fitted on the bushing 38 and has three concentric slip rings 119 made of copper. An insulating block 120 is press-fitted in a bore 121 (FIG. 5) of the leg 46a and carries pins 122 contacting the slip rings 119 and connected with the motor 52 by wires that are not represented.

Part 47 of the swivel support 45 includes besides the tubular portion 48 a drum-shaped portion 70 the outer peripheral surface of which is knurled, and two downwardly directed legs 71 and 72 depending from portion 70. The superposed axles 73 and 74 are journalled with their ends in bores of these legs, as shown in FIG. 3. Fixed to the upper axle 73 are a conical gear 75 meshing with a conical gear 76 secured to the lower end of shaft 56 and a pinion 77. The lower axle 74 rotatably supports a part 78 including a gear wheel 79 meshing with the pinion 77, and a feed wheel 80 having a knurled peripheral edge located in a vertical plane containing the axis of rotation of the shafts 56 and 58, the swivel axis of the swivel support 45 and also the longitudinal axis of the cutting torch 32. The peripheral speed of the feed wheel 80 is the same as the peripheral speed of the feed wheel constituted by the knurled upper end portion 58a of shaft 58.

The inner space of the hollow portion 63 contains auxiliary means, as shown in FIG. 3. A three-phase current supply cable 81 serves for feeding current for the electro-motor 62 and the magnetizing bobbin 68. 82, 83, 84 are manually operable switches, 82 being an "on-off" switch controlling the supply of current to a signal-lamp 86 and to a dry rectifier 85 from which the current then passes to the magnetizing bobbin 68. 84 is an "on-off" switch controlling the electro-motor 52, and 83 is a pole-reversal switch for reversing the direction of rotation of the motor 52. 87 denotes a manaually operable potentiometer for controlling the speed of rotation of the electro-motor 52. 88 denotes a tachometer driven from the shaft 58 by means of the pulley-drive 89, 90 and 91.

The sleeve 39 is made integral with a radial arm 92 to which a rod 93 of a parallel guide arrangement shown in FIG. 2 is pivotally jointed by means of the pivot mounting 94. The parallel guide arrangement furthermore comprises an arm 95 pivotally mounted on the pivot bolt 29, an arm 96 that can be clamped in several angular positions on the pivot bolt 26 by means of a set screw 97, and a rod 98 of which one end is articulated to the free end of arm 96 and the other end of which is articulated, together with the adjacent end of rod 93, to the free end of arm 95.

Arrangements of this kind are widely used in other fields of the technique and their manner of working is therefore well-known. In the machine of the invention the parallel guide arrangement is used for keeping unchanged the orientation of the axis of rotation of the feed wheel 80 as the arms 24 and 27 are swung during feed of the cutting torch 32.

The dot-and-dash lines of FIG. 2 show a different position of arms 24 and 27; moreover, the orientation of the axis of the feed wheel 80 is a different one. Such change of orientation—by small or great amounts—may be carried out after having unlocked the screw 97.

There are releasable means for coupling part 39/92 with part 47. These means are shown in FIGS. 3 and 7. They comprise a piston 99 guided for longitudinal movement in a radial bore of the radial arm 92, and biased by a coil-spring 100 to engage with its inner end 99a one of four blind holes 101 provided at 90° from one another in the drum portion 70 of part 47. The means furthermore comprises a manually operable lever 102 mounted on a pin 103 secured to arm 92. When the longer arm of the lever 102 is depressed towards part 47, the shorter arm engages the piston 99 to move it radially outwardly thereby disengaging the forward end 99a thereof from the hole 101.

The whole swivel support 45 and all the parts supported thereby may then be manually rotated to change the orientation of the axis of rotation of the feed wheel 80. It will be noted that during such rotation no supplemental rotation of the feed wheel 80 will occur, since the drive means are rotated together with the swivel support 45.

A transversal pin 104 secured to the piston 99 extends through an L-shaped slit of arm 92 and is useful for keeping the piston out of engagement with part 47.

Together with the pivot mounting 94 a holder 105 is secured to the outer end of arm 92. To this holder a tubular casing 106 of a follower pin 107 is removably screwed. The follower pin is biased by a spring 108 resting on a part 109 that is screwed into the casing 106.

A compass guide which does not make part of the invention is also provided. This compass guide is represented in FIG. 3a. It comprises a compass beam 110 fitted a one end thereof with a transversal pin 111 by means of which it may be coupled in a very simple manner to the leg 71. The guide furthermore comprises a pot-like member 112 having a diametrical recess through which the beam 110 extends and in which the beam may be set fast by a tightening ring 113 screwably mounted on the member 112. The latter has, on its lower side, a button 114 that can be inserted in the centre hole of a disk-shaped permanent magnet 115 which can be laid somewhere on the table 22 which is made of soft-iron.

It will not be necessary to describe the setting or regulating of the cutting torch 32 because this is well known in the art.

When using the machine for cutting to sheet-metal template, such a template 69 is fastened to the arm 17. The table 22 is preferably removed, as shown in FIG. 8. The portion 58a of the shaft 58 is brought into engagement with the profile of the template, and then the switch 82 is operated to energize the magnetizing bobbin 68. The switch 84 is then actuated to energize the motor 52 whereby the shaft portion 58a will roll along the profile of the template 69 to feed the cutting torch 32. For this manner of use the arm 96 is removed from the bolt 26 and is made to rest on protrusion 116 of rod 93 (FIG. 9). If a template having an inner profile is used, the setting member 42 is turned clockwise (FIG. 6) in order to lower the swivel support 45 and all the parts supported thereby, in order that the upper end 58a of shaft 58 may pass below the template. Afterwards the setting member 42 is operated back to the position shown in FIG. 6 in order to raise the swivel support and to put the shaft portion 58a in engagement with the inner profile of the template.

The manner of use for cutting from drawing is illustrated in FIG. 9. The parallel guide arrangement may then be used, besides the follower arrangement 106—109 the pointer 107 of which will be directed against the drawing 117 affixed to the top of the table 22. When passing from one straight cut to another straight cut perpendicular to the same, the operator need not interrupt the feed, since he can very quickly change the orientation of the feed wheel 80 by acting with the index finger of one hand on the release lever 102 and acting with the thumb of the same hand on the drum portion 70 to rotate the whole swivel support 45 until the end portion 99a of piston 99 will again engage one of the holes 101.

It should also be said that for this manner of use the setting member 42 is rotated from the end position shown in FIG. 6 in order that the swivel support 45 may be free to move upwards and downwards whereby the weight of the whole drive unit including this swivel support will be available to press the feed wheel 80 on the drawing 117 or on the table 22.

For automatic circular cutting, the follower arrangement 106—109 is removed and the compass beam 110 is attached to the leg 71; the magnetic disk 115 is put on the table 13 at an appropriate place and the button 114 of part 112 is inserted in the central hole of this disk. The beam has a scale and the member 112 an index which is directed to this scale; thus, the radius of the circle to be cut in the workpiece can be adjusted and set in a simple manner.

What I claim is:

1. An articulated-arm torch cutting machine comprising, in combination, a stand with an upwardly extending pillar at one side thereof; a bracket secured to said pillar; a primary arm having one end thereof pivoted to said bracket about a vertical axis; a forked secondary arm extending in a vertical plane and having, besides a middle portion articulated to the other end of said primary arm about a vertical axis, an upper leg and a lower leg; a vertically extending, downwardly directed cutting torch mounted on said lower leg; a table carried by said stand to extend horizontally between said upper leg and said lower leg; a template support arm secured to the upper end of said pillar and extending in a generally horizontal direction; a feed unit mounted on said upper leg which has a hollow end portion, this feed unit including a swivel support mainly contained in said hollow end portion and mounted on the same for free rotation about a vertical swivel axis aligned with said cutting torch, a feed shaft made of magnetizable material, mounted in said hollow end portion to be rotatable about the swivel axis of said swivel support and having a freely exposed upper end portion intended to engage with its periphery the leading contour of a template secured to said template support arm, a feed wheel mounted on the freely exposed lower end of said swivel support to be rotatable about a horizontal axis, this feed wheel having a periphery extending in a plane containing the swivel axis of said swivel support, and being intended to engage by its periphery said table, an electric feed motor secured to said swivel support, means transmitting the drive from this feed motor to said feed shaft and said feed wheel; a magnetizing bobbin surrounding said feed shaft; means for energizing this bobbin thereby to magnetize said shaft; a parallel guide arrangement connected to said swivel support, and a follower pin arrangement mounted on said parallel guide arrangement and pointing downwards towards said auxiliary table.

2. An articulated-arm torch cutting machine as claimed in claim 1, in which said feed shaft is of a much smaller diameter than said feed wheel and the peripheral speed of the freely exposed upper end of said feed shaft is equal to the peripheral speed of said feed wheel.

3. An articulated-arm torch cutting machine as claimed in claim 2, which comprises a sleeve mounted in said hollow end portion for rotation about the swivel axis of said swivel support and for longitudinal motion, this sleeve having a radial arm constituting a component of said parallel guide arrangement, and releasable coupling means for coupling said sleeve with said swivel support in any one of four relative angular positions at 90° from one another.

4. An articulated-arm torch cutting machine as claimed in claim 3, which comprises manually operable means movably mounted on said hollow end portion and operable to selectively hold said sleeve and said swivel support in an upper position and to allow free vertical motion of said sleeve and of said swivel support.

References Cited in the file of this patent
UNITED STATES PATENTS

| | | |
|---|---|---|
| 2,015,330 | Anderson | Sept. 24, 1935 |
| 2,494,532 | Ager | Jan. 17, 1950 |